United States Patent
Rotem et al.

(10) Patent No.: US 10,948,966 B1
(45) Date of Patent: Mar. 16, 2021

(54) SYSTEMS AND METHODS FOR OPTIMIZING POWER USAGE FOR SYSTEMS WITHIN QUALITY-OF-SERVICE CONSTRAINTS

(71) Applicant: Facebook, Inc., Menlo Park, CA (US)

(72) Inventors: Nadav Rotem, Santa Clara, CA (US); Abdulkadir Utku Diril, Menlo Park, CA (US); Mikhail Smelyanskiy, Burlingame, CA (US); Jong Soo Park, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 612 days.

(21) Appl. No.: 15/914,362

(22) Filed: Mar. 7, 2018

(51) Int. Cl.
*G06F 1/32* (2019.01)
*G06F 1/3234* (2019.01)

(52) U.S. Cl.
CPC .................. *G06F 1/3234* (2013.01)

(58) Field of Classification Search
CPC .............. G06F 1/3234; G06N 3/063
See application file for complete search history.

(56) References Cited

U.S. PATENT DOCUMENTS

| | | | |
|---|---|---|---|
| 2015/0310311 A1* | 10/2015 | Shi | G06F 15/8023 382/158 |
| 2018/0300615 A1* | 10/2018 | Ambardekar | G06N 3/04 |
| 2020/0089534 A1* | 3/2020 | Chen | G06F 9/5066 |

\* cited by examiner

*Primary Examiner* — Stefan Stoynov
(74) *Attorney, Agent, or Firm* — FisherBroyles, LLP

(57) ABSTRACT

The disclosed computer-implemented method may include (i) identifying an artificial neural network that processes each input to the artificial neural network in a fixed number of operations, (ii) performing an analysis on the artificial neural network to determine an execution metric that represents the fixed number of operations performed by the artificial neural network to process each input, (iii) determining a quality-of-service metric for an executing system that executes the artificial neural network, and (iv) optimizing power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system. Various other methods, systems, and computer-readable media are also disclosed.

20 Claims, 7 Drawing Sheets

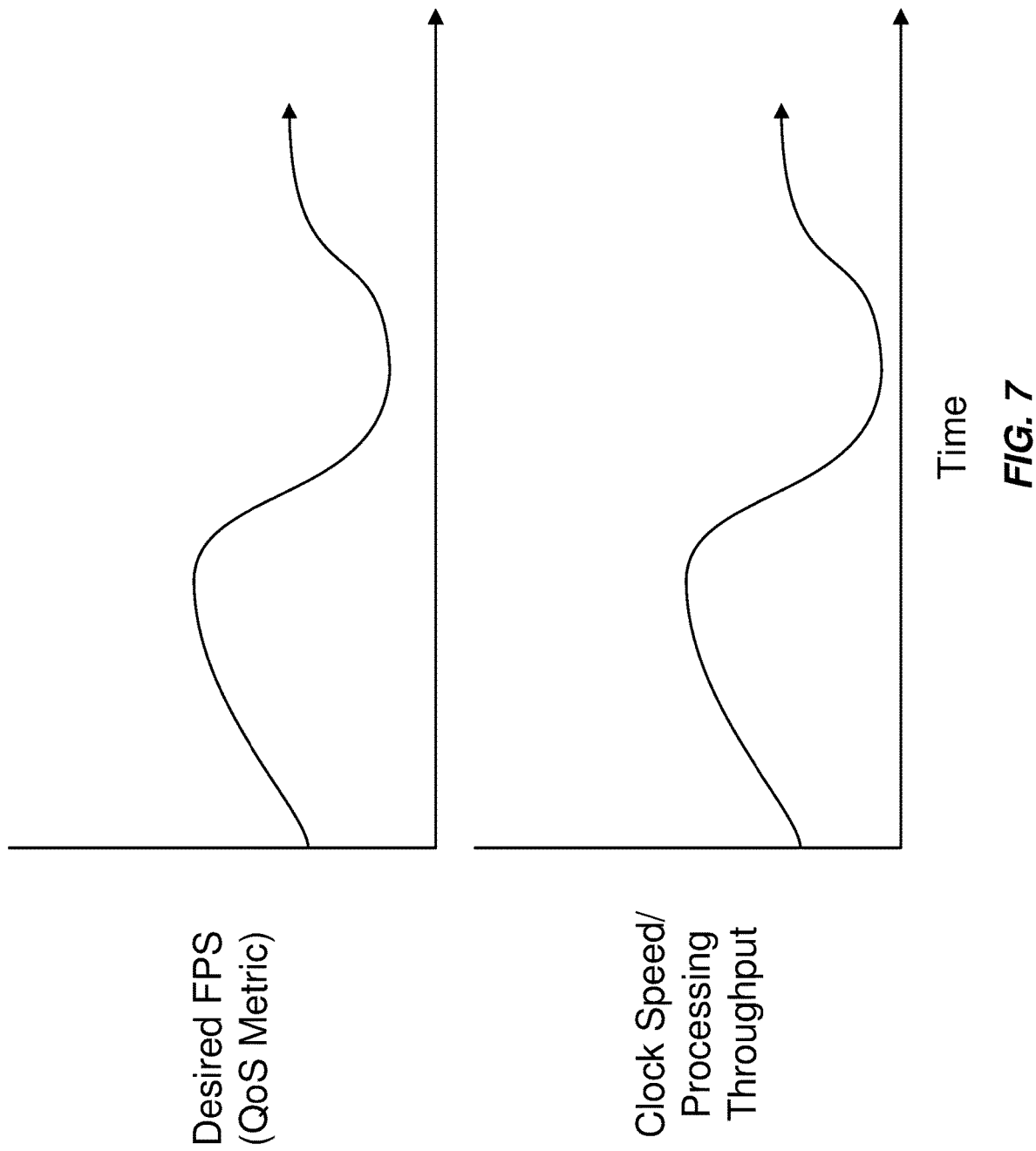

SYSTEMS AND METHODS FOR OPTIMIZING POWER USAGE FOR SYSTEMS WITHIN QUALITY-OF-SERVICE CONSTRAINTS

BACKGROUND

Various devices, appliances, and other systems employ complex software to perform a variety of tasks. For example, mobile phones may use artificial neural networks to perform facial recognition. As an additional example, a self-driving vehicle may use an artificial neural network trained to perform machine-vision tasks, enabling the vehicle to navigate its surroundings. These devices and systems may utilize a variety of physical hardware to execute this software.

Many systems performing complex tasks may have strict quality-of-service requirements. For example, video processing on a mobile device may need to handle a minimum number of frames per second to ensure a positive user experience. Additionally, such systems may be constrained by limited resources, such as battery power. Designers of these systems and/or devices may thus seek to minimize resource consumption while also ensuring that any applicable quality-of-service requirements are met. The instant disclosure therefore identifies and addresses a need for improved systems and methods for optimizing power usage of systems within quality-of-service constraints.

SUMMARY

As will be described in greater detail below, the instant disclosure describes systems and methods for configuring processors (e.g., by adjusting processor clock speed) to meet quality-of-service demands from systems that rely on outputs from executing components while minimizing power consumption of the processors based on information about artificial neural networks within the executing components. For example, a computer-implemented method for optimizing power usage for systems within quality-of-service constraints may include (i) identifying an artificial neural network that processes each input to the artificial neural network in a fixed number of operations, (ii) performing an analysis on the artificial neural network to determine an execution metric that represents the fixed number of operations performed by the artificial neural network to process each input, (iii) determining a quality-of-service metric for an executing system that executes the artificial neural network, and (iv) optimizing power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system.

The computer-implemented method may configure the processing throughput of the physical processor(s) by configuring a clock speed of the physical processor(s).

In some embodiments, the quality-of-service metric may indicate a desired number of inputs to the artificial neural network to be processed by the executing system within a pre-determined amount of time. For example, in embodiments where the inputs to the artificial neural network are image frames, the quality-of-service metric may indicate a desired number of image frames per second to be processed by the executing system.

In some examples, the above-described method may include detecting a change in the quality-of-service metric. In these examples, the computer-implemented method may, in response to detecting the change in the quality-of-service metric, re-optimize the power consumption of the executing system by reconfiguring the processing throughput of the physical processor(s) based on the execution metric and the updated quality-of-service metric.

The computer-implemented method may analyze the artificial neural network in a variety of ways. For example, the analysis may include a static analysis of the artificial neural network to determine the execution metric without executing the artificial neural network. In some embodiments, performing the analysis may include performing the analysis when the artificial neural network is compiled. Additionally or alternatively, performing the analysis may occur in response to identifying the artificial neural network as a processing element within the executing system that predictably processes each input in a fixed number of operations.

Moreover, performing the analysis may include calculating the fixed number of operations based on a variety of factors. For example, performing the analysis may include identifying a number of artificial neurons included in the artificial neural network, as well as a number of neural network layers included in the artificial neural network. In such an example, performing the analysis may include calculating the fixed number of operations based on at least the number of artificial neurons and the number of neural network layers included in the artificial neural network. Additionally or alternatively, performing the analysis may include calculating the fixed number of operations based on an architecture of the executing system.

The computer-implemented method may communicate the execution metric to the executing system in a variety of ways. For example, performing the analysis on the artificial neural network may include storing the execution metric in metadata that is associated with the artificial neural network. In this example, configuring the processing throughput of the physical processor(s) of the executing system may include (i) retrieving the execution metric from the metadata associated with the artificial neural network, and (ii) providing the execution metric to a management system that configures the processing throughput of the physical processor(s).

In some embodiments, configuring the processing throughput of the physical processor(s) may include configuring the physical processor(s) to execute the artificial neural network on a number of processor cores that enables the executing system to satisfy the quality-of-service metric while limiting the power consumption of the executing system.

The artificial neural network itself may be implemented in a variety of ways. For example, the artificial neural network may represent a software-implemented artificial neural network. Additionally or alternatively, the artificial neural network may represent a hardware-implemented neural network.

In addition, a corresponding system for optimizing power usage for systems within quality-of-service constraints may include several modules stored in a memory of the system. Such a system may include (i) an identification module, stored in the memory of the system, that identifies an artificial neural network that processes each input to the artificial neural network in a fixed number of operations, (ii) an analysis module, stored in the memory, that performs an analysis on the artificial neural network to determine an execution metric that represents the fixed number of operations performed by the artificial neural network to process each input, (iii) a determination module, stored in the memory, that determines a quality-of-service metric for an executing system that executes the artificial neural network, (iv) an optimization module, stored in the memory, that optimizes power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system, and (v) at least one executing physical processor configured to execute the identification module, the analysis module, the determination module, and the optimization module.

In some examples, the above-described methods may be encoded as computer-readable instructions on a computer-readable medium. Such a computer-readable medium may include one or more computer-executable instructions that, when executed by at least one processor of a computing device, may cause that computing device to (i) identify an artificial neural network that processes each input to the artificial neural network in a fixed number of operations, (ii) perform an analysis on the artificial neural network to determine an execution metric that represents the fixed number of operations performed by the artificial neural network to process each input, (iii) determine a quality-of-service metric for an executing system that executes the artificial neural network, and (iv) optimize power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 7 is a graph diagram illustrating a relationship between changing quality-of-service metrics and processing throughput of a system that executes an artificial neural network.

Figure 1:
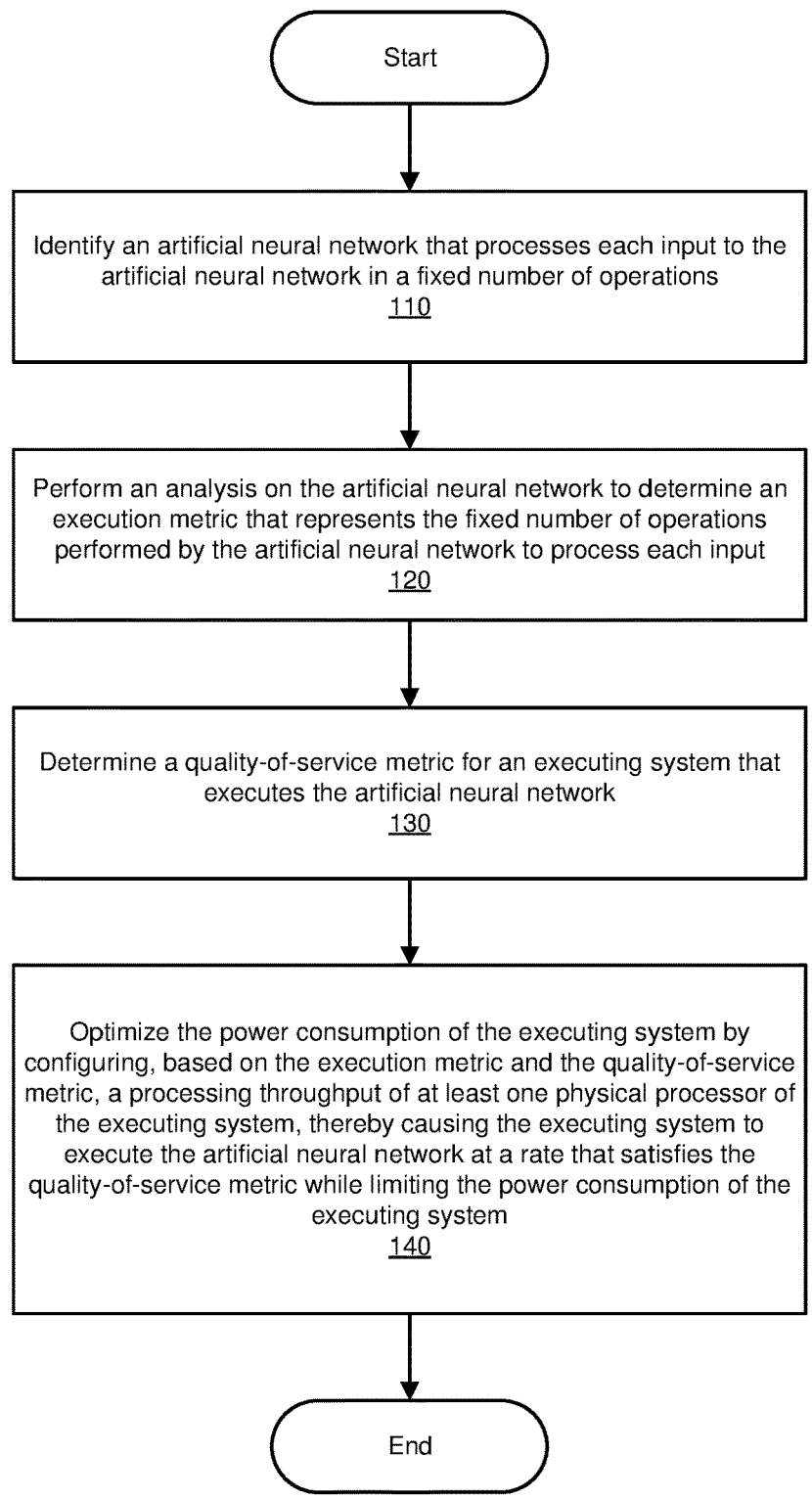
FIG. 1 is a flow diagram of an example method for optimizing power usage for systems within quality-of-service constraints.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to optimizing power usage for systems within quality-of-service constraints. As will be explained in greater detail below, embodiments of the instant disclosure may enable systems that execute artificial neural networks to accurately and efficiently configure the physical hardware that executes an artificial network to minimize power consumption while satisfying applicable quality-of-service metrics. Various execution metrics of artificial neural networks, such as the number of mathematical operations required to process an input to the artificial neural network, may be highly predictable. Analysis systems may precisely determine these execution metrics (without, e.g., relying on expensive and uncertain techniques involving executing the artificial neural network and measuring its performance) and thereby provide optimization systems with information necessary to ensure that quality-of-service requirements are met while also minimizing resource consumption. These optimization systems may then be able to configure the physical hardware that executes an artificial neural network to minimize power and other resource usage. For example, a control system of a self-driving vehicle may have strict quality-of-service requirements (e.g., processing sensor inputs sufficiently fast to avoid collisions) and constrained resources such as battery life. Such a vehicle may include an optimization component to ensure that software executing on the self-driving vehicle's control systems are able to meet quality-of-service demands while minimizing power consumption, thereby maximizing the vehicle's operational range and/or battery life.

Moreover, the systems and methods described herein may improve the functioning of a computing device by configuring physical processor(s) of the computing device to execute an artificial neural network at a minimum processor throughput that satisfies any applicable QoS metrics. The systems and methods described herein may configure the processor throughput of the computing device based on execution metrics of the artificial neural network that were determined prior to executing the artificial neural network, thereby reducing the overhead resource costs of configuring the physical processor(s). By configuring physical processors to execute artificial neural networks at a minimum acceptable processor throughput, the systems and methods described herein may enable executing systems to meet QoS demands while minimizing power consumption. Minimizing the power consumption of a computing system in this way, the systems and methods described herein may reduce the financial cost of executing artificial neural networks, improve the battery life of power-constrained systems, and/or reduce the heat generated by the computing system.

As an additional example, a facial recognition component of a mobile device may utilize an artificial neural network to assist with face-based authentication to the mobile device. In this example, the applicable quality-of-service metrics may be relaxed; in other words, an end user may not notice if the authentication completes in 0.1 seconds versus 0.5 seconds. A power management system may therefore configure the mobile device to execute the artificial neural network at a slower processor throughput to conserve power and maximize the battery life of the mobile device. As may be appreciated from the above-described examples, the systems and methods described herein may improve the efficiency of hardware that executes artificial neural networks.

The following will provide, with reference to FIG. 1, detailed descriptions of an example method for optimizing the power usage of systems that execute artificial neural networks. Detailed descriptions of example systems for optimizing the power usage attributable to artificial neural networks will be provided in connection with FIGS. 2-3, and descriptions of an example artificial neural network will be provided in connection with FIG. 4. Detailed descriptions of an example self-driving vehicle that optimizes the execution of an artificial neural network will be provided in connection with FIG. 5 Descriptions of relationships between processor throughput and processor power consumption will be provided in connection with FIG. 6. Additionally, detailed descriptions of how the systems and methods described herein may respond to varying quality-of-service (QoS) metrics will be described in connection with FIG. 7.

FIG. 1 is a flow diagram of an exemplary computer-implemented method 100 for optimizing the power consumption attributable to an artificial neural network. The steps shown in FIG. 1 may be performed by any suitable computer-executable code and/or computing system, including the systems illustrated in FIGS. 2-4. In one example, each of the steps shown in FIG. 1 may represent an algorithm whose structure includes and/or is represented by multiple sub-steps, examples of which will be provided in greater detail below.

As illustrated in FIG. 1 at step 102, one or more of the systems described herein may identify an artificial neural network that processes each input to the artificial neural network in a fixed number of operations. For example, identification module 104 in FIG. 2 may identify artificial neural network 202 as an artificial neural network that processes inputs in a fixed number of operations.

Identification module 104 may identify artificial neural network 202 in a variety of contexts. For example, identification module 104 may execute as part of optimization software that manages the power usage of a particular computing system. In these examples, identification module 104 may identify artificial neural network 202 prior to the computing system executing artificial neural network 202. Additionally or alternatively, identification module 104 may receive artificial neural network 202 as a user-initiated input. For example, a software technician may provide artificial neural network 202 to identification module 104 as part of configuring a system that will execute artificial neural network 202.

In further embodiments, identification module 104 may execute as part of a software compilation suite that pre-processes software before delivering that software to an executing system. For example, identification module 104 may execute as part of a pre-processing suite that analyzes artificial neural networks to enable other systems to execute those artificial neural networks while minimizing power consumption. In these examples, the pre-processing suite may communicate information to these executing systems in a variety of ways that will be described in greater detail below. Such pre-processing may occur at any suitable point, such as when the artificial neural network is being compiled and/or after the artificial neural network has been compiled but before the artificial neural network is executed by an executing system.

In some embodiments, the term "artificial neural network" may refer to any software and/or hardware composed of interconnected processing nodes. These processing nodes, which may be referred to as "artificial neurons," may receive inputs and pass outputs to other artificial neurons. The output of each artificial neuron may be determined by a nonlinear function combination of each input to the artificial neuron, and each connection between artificial neurons may be assigned a "weight" that determines the degree to which a particular connection contributes to the output of the destination neuron(s). Artificial neural networks may be used in a variety of contexts, including, without limitation, image recognition, computer vision, speech recognition, and medical diagnosis. Artificial neural networks may be implemented in a variety of ways. In some embodiments, an artificial neural network may be implemented as software programs and/or any other suitable form of computer-readable instructions that are executed on one or more physical processors. In further embodiments, and artificial neural network may be implemented in physical hardware, such as a series of interconnected physical processors with each processor unit acting as an artificial neuron.

Figure 2:
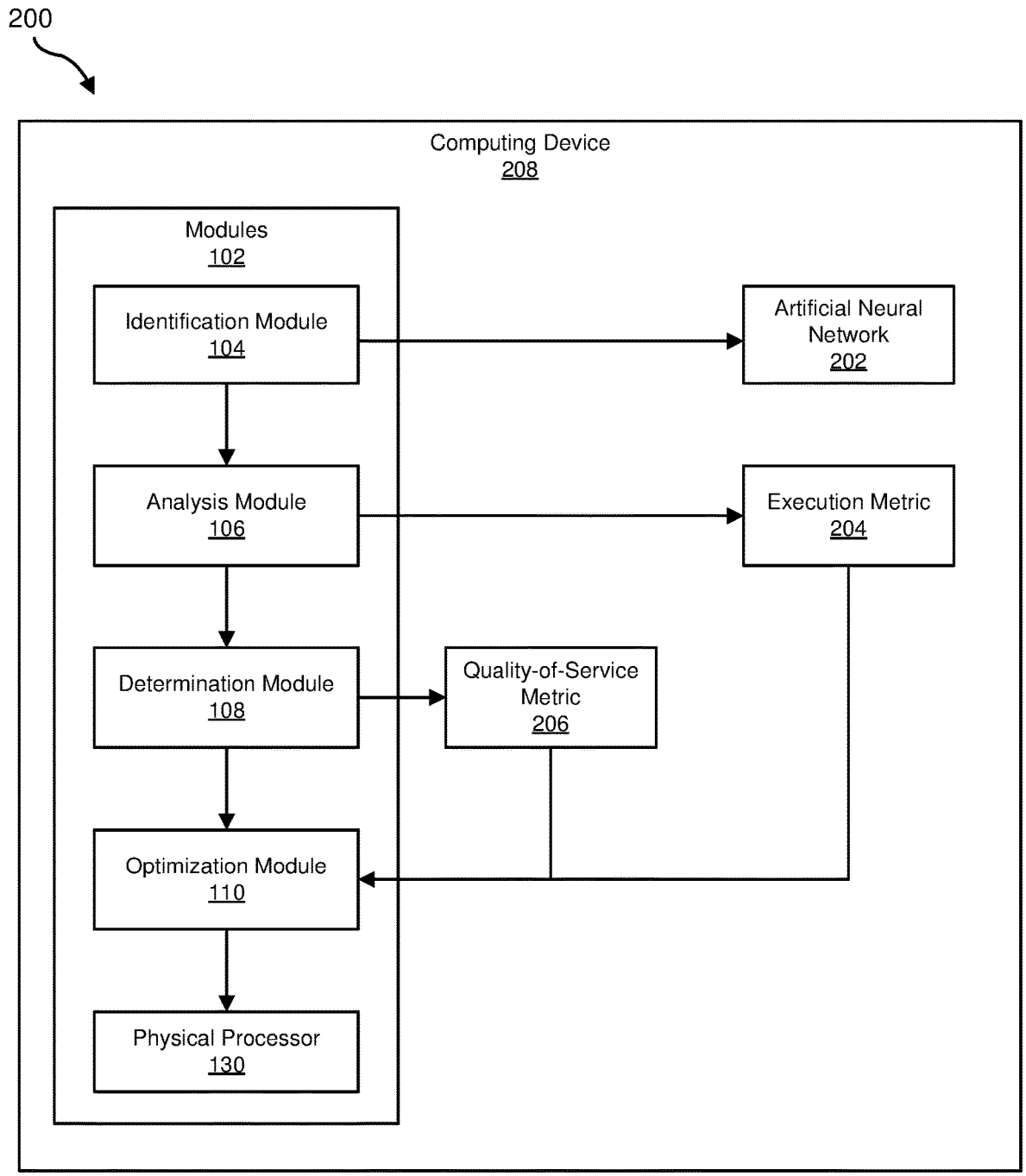
FIG. 2 is a block diagram of an example system for optimizing power usage for systems within quality-of-service constraints.
Figure 3:
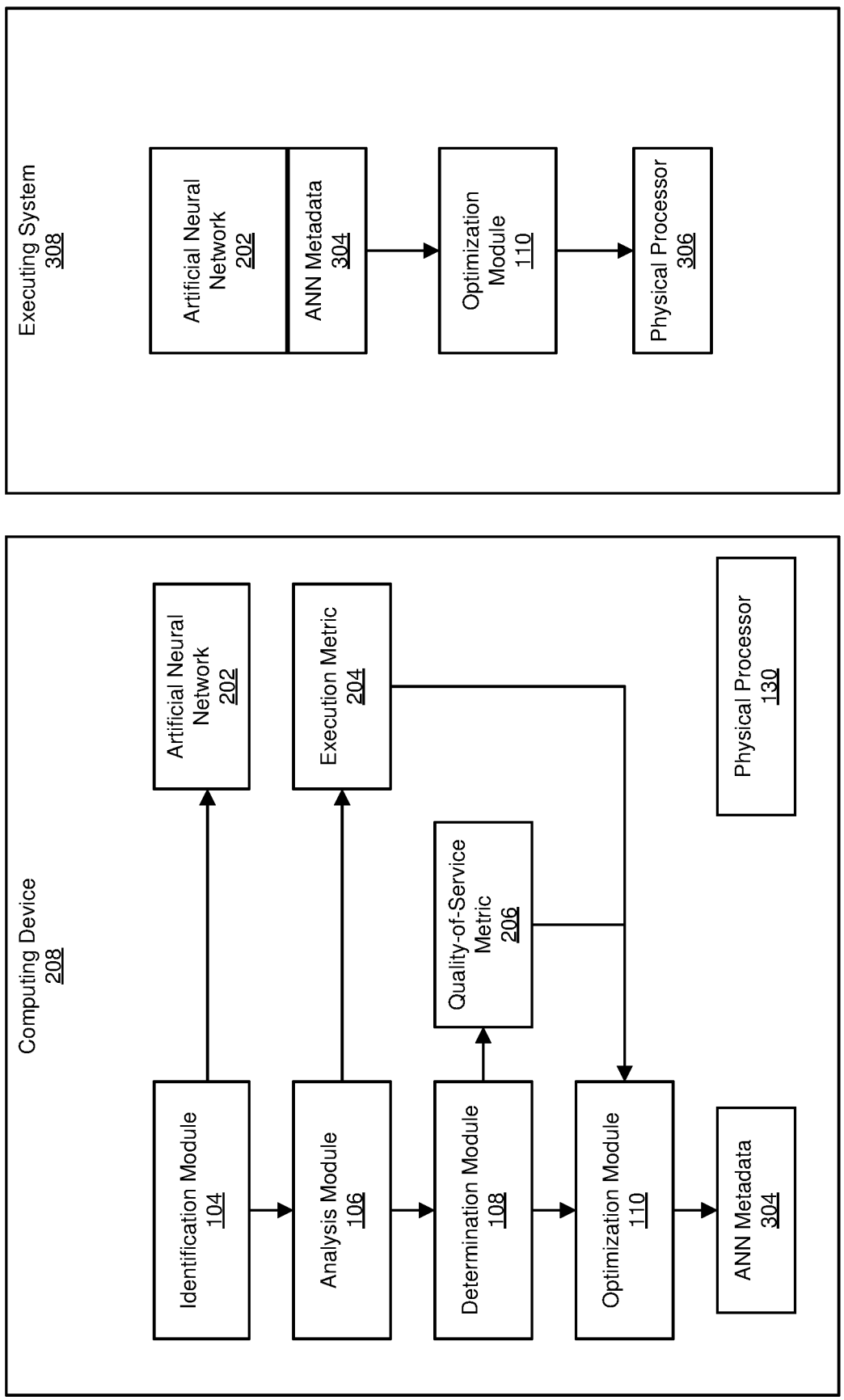
FIG. 3 is a block diagram of an additional example system for optimizing power usage for systems within quality-of-service constraints.

In some examples, the term "executing system" may refer to any suitable computing device and/or computing system that executes artificial neural network 202. In some embodiments, the executing system may also analyze artificial neural network 202. For example, and as illustrated in FIG. 2, computing device 208 both analyzes artificial neural network 202 and executes artificial neural network 202 on physical processor 130. Examples of computing devices and/or computing systems that may both analyze and execute artificial neural network 202 include, without limitation, distributed computing platforms and software-as-a-service (SaaS) backend systems that perform computing tasks for clients. In further embodiments, the system that analyzes artificial neural network 202 may be separate and distinct from the system that executes artificial neural network 202. For example, and as illustrated in FIG. 3, computing device 208 may analyze artificial neural network 202 and communicate various metrics to executing system 308 through artificial neural network (ANN) metadata 304. Detailed aspects of these embodiments will be described in greater detail below.

Returning to FIG. 1 at step 120, one or more of the systems described herein may perform an analysis on the artificial neural network to determine an execution metric that represents the fixed number of operations performed by the artificial neural network to process each input. For example, analysis module 106 in FIG. 2 may analyze artificial neural network 202 to determine execution metric 204 that represents the fixed number of operations performed by artificial neural network 202 when processing an input.

Analysis module 106 may determine execution metric 204 in a variety of contexts. In some embodiments, analysis module 106 may analyze artificial neural network 202 by performing a static analysis of artificial neural network 202 to determine execution metric 204 without executing artificial neural network 202. In these embodiments, artificial neural network 202 may include software and/or hardware structures that process inputs in a predictable fashion. In other words, it may be possible to determine execution metric 204 by examining the structure of artificial neural network 202.

Figure 4:
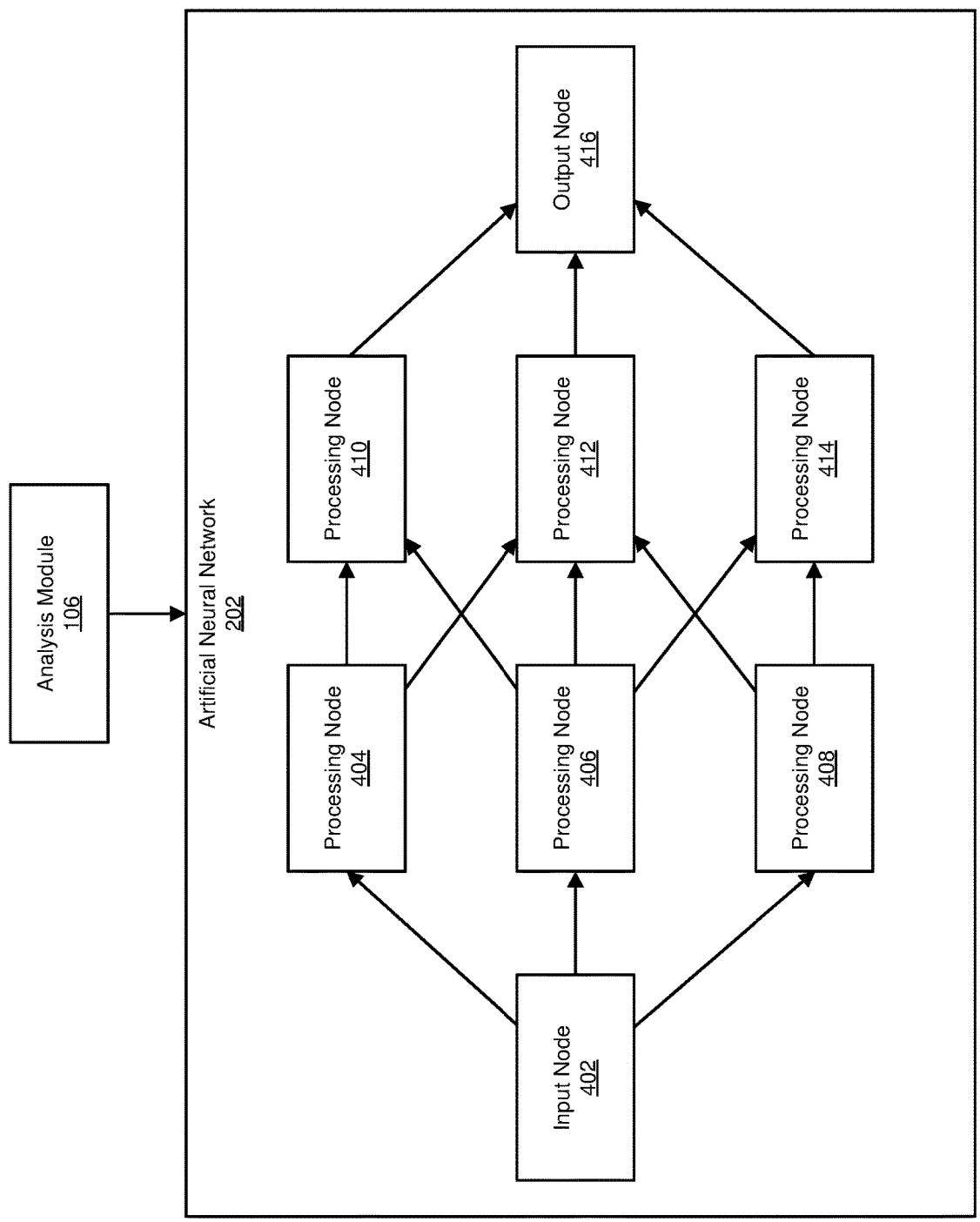
FIG. 4 is a block diagram of an example artificial neural network.

FIG. 4 is an illustrated example of an artificial neural network, including the underlying structure of the processing nodes that make up the artificial neural network. As shown in FIG. 4, artificial neural network 202 may include an input node 402 that receives inputs to artificial neural network 202. For example, input node 402 may receive images to be processed by artificial neural network 202. Input node 402 may perform an operation based on the input and pass a result of the operation to processing nodes 404, 406, and 408. Each of these processing nodes may assign a mathematical weight to the input received from input node 402, perform their own operations based on the weighted inputs, and pass the results of the operation to additional processing nodes. In the example of FIG. 4, processing node 404 passes its output to processing nodes 410 and 412, processing node 406 passes its output to processing nodes 410, 412, and 41, and processing node 408 passes its output to processing nodes 412 and 414.

Although artificial neural network 202 as shown in FIG. 4 includes a single input node, six processing nodes arranged in two layers, and a single output node, other examples of artificial neural networks may contain any number of input nodes, processing nodes, and/or output nodes connected in any suitable fashion. For example, nodes on the first layer of a more complex artificial neural network may be directly connected to nodes on both the second and third layer of the artificial neural network. Regardless of the number and/or arrangement of nodes, analysis module 106 may nevertheless be able to determine execution metric 204 by inspecting the number of nodes and the arrangement of the nodes that make up artificial neural network 202.

In some examples, analysis module 106 may perform the analysis on the artificial neural network occurs in response to identifying artificial neural network 202 as a processing element (e.g., within a larger software and/or hardware system) that predictably processes each input in a fixed number of operations. In some embodiments, analysis module 106 may perform the analysis in response to information received from identification module 104. For example, identification module 104 may identify artificial neural network 202 as a component of a larger software system (e.g., a machine vision component of control software in a self-driving vehicle) that predictably processes inputs in a fixed number of operations. identification module 104 may notify analysis module 106, thereby prompting analysis module 106 to process artificial neural network 202. Additionally or alternatively, analysis module 106 may perform a preliminary analysis on software and/or hardware identified by identification module 104 to confirm that the identified software and/or hardware predictably processes each input in a fixed number of operations. Analysis module 106 may then, based on a result of the preliminary analysis, proceed to analyze the identified software and/or hardware as artificial neural network 202.

In further examples, analysis module 106 may perform the analysis of artificial neural network 202 when artificial neural network 202 is compiled. For example, analysis module 106 may execute as part of software that compiles artificial neural network 202, such as an integrated development environment (IDE). In these examples, an administrator and/or software engineer may direct the compiler software to analyze artificial neural network 202. Additionally or alternatively, the compiler may include an instance of analysis module 106 that performs a preliminary analysis on software being compiled to determine whether the software predictably processes inputs in a fixed number of operations, as described above.

Analysis module 106 may identify artificial neural network 202 in a variety of contexts. For example, a user may direct analysis module 106 to analyze a software package and indicate that the software package represents an artificial neural network that predictably processes inputs in a fixed number of operations. In these examples, analysis module 106 may therefore treat the input as artificial neural network 202. Additionally or alternatively, analysis module 106 may execute as part of a software analysis suite that determines execution metrics for software packages that may contain various generic software components in addition to artificial neural network components. For example, analysis module 106 may represent a portion of an IDE that performs a preliminary analysis on software as the software is compiled. Additionally or alternatively, analysis module 106 may represent a component of an optimization suite that analyzes a software package to determine optimal execution conditions for that software package to ensure that executing systems are able to meet QoS demands while minimizing resource consumption.

Analysis module 106 may perform any of a variety of types of analysis on software components based on whether a given software component represents an artificial neural network. In some embodiments, analysis module 106 may, as part of the above-described software analysis suite, determine that a software component represents a processing element that predictably processes each input in a fixed number of operations. Analysis module 106 may make this determination in a variety of ways. For example, analysis module 106 may recognize software structures known to be associated with artificial neural networks, such as a collection of interconnected processing nodes arranged in layers as illustrated in FIG. 4. Analysis module 106 may accordingly determine that the software component represents an artificial neural network. Based on this determination, analysis module 106 may prompt the software analysis suite to treat the software component differently from other software components that do not represent artificial neural networks. For example, analysis module 106 may prompt the software analysis suite to perform a static analysis on the artificial neural network component(s) of a software package rather than a more resource-intensive dynamic analysis that the software analysis suite might perform on other components of the software package.

Similarly, in embodiments where the software analysis suite performs a static analysis of a software package, analysis module 106 may perform a more efficient static analysis on components that are determined to represent artificial neural networks versus generic executable components of the software package. For example, the software analysis suite may perform an architecture-agnostic static analysis on generic components of a software package. However, analysis module 106 may prompt the software analysis suite to perform a static analysis that accounts for factors specific to artificial neural networks. Examples of factors specific to artificial neural networks include, without limitation, models of neural network functionality, efficiency metrics of various neural network components (e.g., as defined in a lookup table), processor operations performed to implement various neural network components (e.g., as defined in a lookup table).

By performing forms of analysis that are specifically tailored to artificial neural networks in these ways, analysis module 106 may enable a software analysis suite to determine higher-confidence execution metrics to artificial neural network components of a software package versus lower-confidence execution metrics determined for other components of the software package. For example, analysis module 106 may generate execution metrics with less margin of error, a more precise range, and/or a more accurate determination of the processing throughput consumed by the execution of an artificial neural network over a generic, architecture-agnostic analysis of an artificial neural network. These higher-confidence execution metrics may improve the ability of executing systems to meet QoS demands while minimizing power consumption. For example, the systems and methods described herein may determine a more precise range of execution metrics for artificial neural network 202 than might be determined by a conventional analysis, enabling executing systems to use a less resource-intensive processing throughput while still having a high assurance of meeting QoS demands.

Analysis module 106 may perform a variety of tasks as part of analyzing neural network 202. For example, analysis module 106 may identify a number of artificial neurons included in artificial neural network 202 and a number of neural network layers included in artificial neural network 202. Analysis module 106 may then determine execution metric 204 based on at least the number of artificial neurons and the number of neural network layers included in the artificial neural network. In the example of FIG. 4, analysis module 106 may determine that artificial neural network 202 includes 8 processing nodes arranged in four layers. Analysis module 106 may then, based on this architecture of artificial neural network 202, determine the fixed number of operations performed by artificial neural network 202 to process an input.

In some embodiments, analysis module 106 may determine a level of confidence in execution metric 204. For example, analysis module 106 may determine a range of possible execution metrics that may apply to artificial neural network 202. As a specific example, analysis module 106 may determine that the actual number of mathematical operations that will be performed by artificial neural network 202 lies within a range of estimated operation counts.

In addition to or instead of performing a certain type of analysis on artificial neural network 202 based on artificial neural network 202 being a neural network, analysis module 106 may assign a higher degree of confidence to results of an analysis of artificial neural network 202 based on artificial neural network 202 being a neural network. For example, some methods of analysis may allow for estimations of execution times and/or processing cycles consumed by a system component. Accordingly, in some examples, these methods of analysis may produce a range of possible execution times. However, due to the precision of analysis made possible by recognizing artificial neural network 202 as an artificial neural network, analysis module 106 may confidently tighten the range of possible execution times for artificial neural network 202 (or for a larger system that includes artificial neural network 202). Accordingly, the high end of a range of possible execution times for artificial neural network 202 may be lower than it would be had analysis module 106 performed an analysis on artificial neural network 202 that did not recognize artificial neural network 202 as an artificial neural network. Analysis module 106 may thereby produce execution metric 204 with greater precision.

Moreover, analysis module 106 may account for features of the executing system when determining execution metric 204 (e.g., analysis module 106 may account for the architecture of the executing system). For example, analysis module 106 may consider various aspects of computing device 208 in FIG. 2 and/or executing system 308 in FIG. 3 when determining execution metric 204. As an example, analysis module 106 may account for the fact that different physical processors may process artificial neural network 202 in different numbers of clock cycles. Analysis module 106 may, in the example of FIG. 2, retrieve system architecture data from computing device 208 when determining execution metric 204. Additionally or alternatively, analysis module 106 may, in the example of FIG. 3, determine execution metrics for a variety of different system architectures and include all or a portion of these metrics in ANN metadata 304. In some examples, one or more systems may deliver ANN metadata to an executing system along with artificial neural network 202 and/or a larger system that incorporates artificial neural network 202. For example, a software deployment system may provision a self-driving vehicle with software control systems that incorporate artificial neural network 202 and accordingly also provide the self-driving vehicle with ANN metadata 304. By packaging artificial neural network 202 with ANN metadata 304 in this way, the systems and methods described herein may ensure that the execution metrics associated with artificial neural network 202 are transparent and available to various systems, such as power management systems, on computing systems that execute artificial neural network 202.

As mentioned briefly above, analysis module 106 may include execution metric 204 in metadata that is associated with the artificial neural network. For example, and with reference to FIG. 3, analysis module 106 may include execution metric 204 in ANN metadata 304. In embodiments where analysis module 106 determines execution metrics for a variety of executing system architectures, an executing system may retrieve an execution metric appropriate to executing system 308 when optimizing the power consumption of executing system 308 as will be described in greater detail below.

Returning to FIG. 1 at step 130, one or more of the systems described herein may determine a quality-of-service metric for an executing system that executes the artificial neural network. For example, determination module 108 in FIG. 2 may determine quality-of-service metric 206 for computing device 208, presuming that computing device 208 will execute artificial neural network 202.

In some embodiments, the term "quality-of-service" ("QoS") may refer to a description and/or measurement of the overall performance of a service. With regards to the systems and methods described herein, QoS may refer to a rate at which the executing system executes artificial neural network 202, a rate at which the executing system processes inputs to artificial neural network 202, and/or any other suitable metric that describes the overall performance of the executing system and/or artificial neural network 202.

QoS metrics may be described in a variety of ways. In some embodiments, a QoS metric may describe a desired number of inputs to artificial neural network 202 to be processed by the executing system within a predetermined amount of time. As a specific example, quality-of-service metric 206 may include a number of inputs to be processed per second. QoS metrics may optionally include more specific information. For example, in embodiments where the inputs to artificial neural network 202 include image frames, quality-of-service metric 206 may describe a desired number of frames per second to be processed by artificial neural network 202. As an illustrated example, and with reference to FIG. 3, executing system 308 may process image frames as inputs. As a specific example, a control system for executing system 308 may determine that executing system 308 should process, at minimum, 120 frames per second. In this example, the QoS metric would include 120 frames per second. Additionally or alternatively, quality-of-service metric 206 may describe a maximum amount of time to be consumed by artificial neural network 202 when processing an input.

Although the preceding descriptions describe QoS metrics using time as the primary resource, QoS metrics may describe any suitable metric or combination of metrics. For example, a QoS metric may indicate a maximum amount of power to be consumed by an executing system when processing inputs to artificial neural network 202, a minimum processing resolution at which to analyze inputs (e.g., images must be processed at 360 dots per inch (DPI) or greater), and/or any other suitable metric.

Moreover, quality-of-service metric 206 may change over time. For example, an executing system that operates within a dynamic environment may change quality-of-service metric 206 in response to external stimuli. As a specific example, a self-driving vehicle may vary the quality-of-service metrics provided to artificial neural network 202 based on the vehicle's speed, the number of surrounding vehicles and other obstacles, weather conditions, etc.

Figure 5:
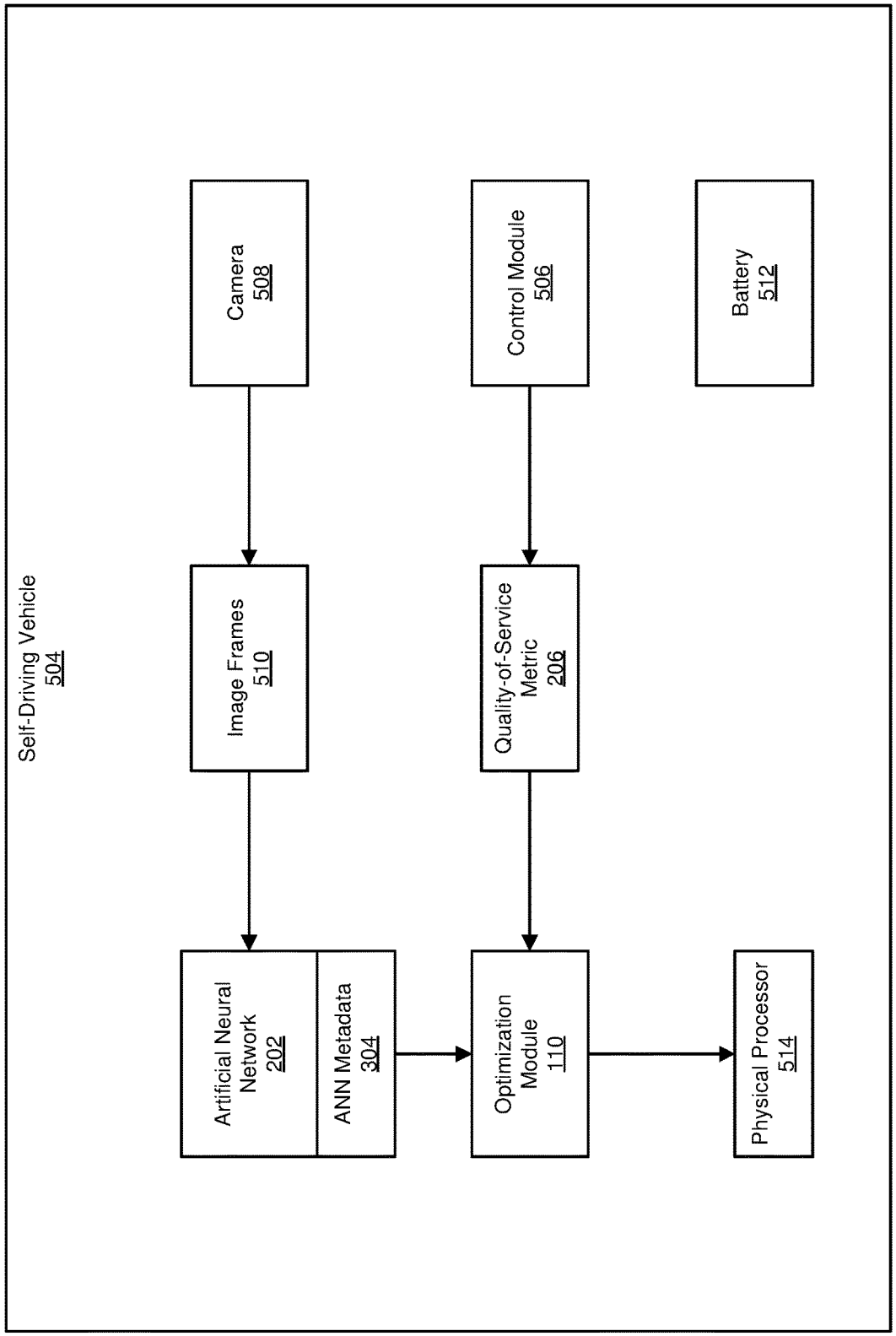
FIG. 5 is a block diagram of an example self-driving vehicle that optimizes the power usage attributable to an onboard artificial neural network.

FIG. 5 is an illustrated example of a self-driving vehicle that implements some or all of the systems described herein. As shown in FIG. 5, a self-driving vehicle 504 may include a number of subsystems. For example, self-driving vehicle 504 may be equipped with a camera 508 that scans the area around self-driving vehicle 504 for other vehicles and/or obstacles. Camera 508 may generate image frames 510 that represent, for example, frames from video captured by camera 508. Control systems of self-driving vehicle 504 may provide image frames 510 to artificial neural network 202 as part of a machine vision system that enables self-driving vehicle 504 to navigate its surroundings. A control module 506 that directs the motion of self-driving vehicle 504 may provide quality-of-service metric 206 to determination module 108 (not illustrated in FIG. 5). Analysis module 106 may have stored execution metrics within ANN metadata 304 associated with artificial neural network 202, as described in greater detail above. Self-driving vehicle 504 may also include an instance of optimization module 110 to ensure that artificial neural network 202 is able to meet the QoS demands set by control module 506. Optimization module 110 may configure at least one physical processor of self-driving vehicle 504, illustrated as physical processor 514, as will be described in greater detail below.

Returning to FIG. 1 at step 140, one or more of the systems described herein may optimize the power consumption of the executing system by configuring, based on the execution metric and the quality-of-service metric, a processing throughput of at least one physical processor of the executing system. Configuring the physical processor in this way may cause the executing system to execute the artificial neural network at a rate that satisfies the quality-of-service metric while limiting the power consumption of the executing system. For example, optimization module 110 in FIG. 2 may configure physical processor 130 based on execution metric 204 and quality-of-service metric 206, thereby causing computing device 208 to execute artificial neural network 202 at a rate that satisfies quality-of-service metric 206 while limiting the power consumption of computing device 208.

Optimization module 110 may optimize physical processor 130 in any of a variety of ways. For example, optimization module 110 may adjust the processing throughput of physical processor 130, causing an accompanying change in the power consumption of physical processor 130. In some embodiments, optimization module 110 may configure a clock speed of physical processor 130. Additionally or alternatively, optimization module 110 may configure a processor voltage of physical processor 130. When optimizing physical processors that include more than one processing core, optimization module 110 may configure those physical processors to execute artificial neural network 202 on a number of processor cores that enables the executing system to satisfy the quality-of-service metric while limiting the power consumption of the executing system. For example, physical processor 130 may include six processing cores. However, optimization module 110 may determine, based on execution metric 204 and quality-of-service metric 206, that physical processor 130 may satisfy quality-of-service metric 206 by executing artificial neural network 202 on four out of its six cores. Optimization module 110 may accordingly configure physical processor 130 to execute artificial neural network 202 on four processing cores to ensure that the executing system meets quality-of-service metric 206 while minimizing the power consumption of the executing system. In some examples, one or more of the systems described herein (e.g., optimization module 110) may reduce power consumption of cores not used to execute artificial neural network 202 by implementing a clock gating and/or power gating technique on one or more of the unused cores.

In some embodiments, optimization module 110 may configure more than one aspect of physical processor 130. For example, optimization module 110 may configure the clock speed and the voltage of physical processor 130. In embodiments where physical processor 130 represents a multiple-core processor, optimization module 110 may configure physical processor 130 as a whole, i.e., as a single processing unit (thereby, e.g., adjusting each core). Alternatively, optimization module 110 may separately configure each core of physical processor 130. For example, physical processor 130 may represent a processor that includes two processing cores with different performance characteristics (e.g., different power consumption/performance curves). In this example, optimization module 110 may configure one of the two cores to execute artificial neural network 202 at a particular clock speed and/or voltage, and configure the other core to execute artificial neural network 202 at a different clock speed and/or voltage from the first core (e.g., such that the combined power consumption of the two cores is minimized under the constraint that the combined processing throughput of the two cores meets a quality-of-service objective). As an additional example, optimization module 110 may determine that physical processor 130 is only executing artificial neural network 202 on a single core. In this example, optimization module 110 may configure the core of physical processor 130 that executes artificial neural network 202 while refraining from altering the configuration of other cores included in physical processor 130 that do not execute artificial neural network 202 and are therefore not implicated in a quality-of-service objective involving artificial neural network 202.

In executing systems that include multiple processors, optimization module 110 may configure any or all of these physical processors as appropriate. For example, a cloud-based SaaS platform that hosts an instance of artificial neural network 202 may also include an instance of optimization module 110 to ensure that the SaaS platform is able to meet customer QoS demands while simultaneously minimizing the power consumption of the physical hardware that executes artificial neural network 202. As a specific example, optimization module 110 may configure the SaaS platform to execute artificial neural network 202 on an appropriate number of physical processors and/or processor cores configured to operate at clock speeds and/or processor voltages that will enable the platform to meet customer QoS needs while minimizing the overall power usage of the SaaS platform.

Figure 6:
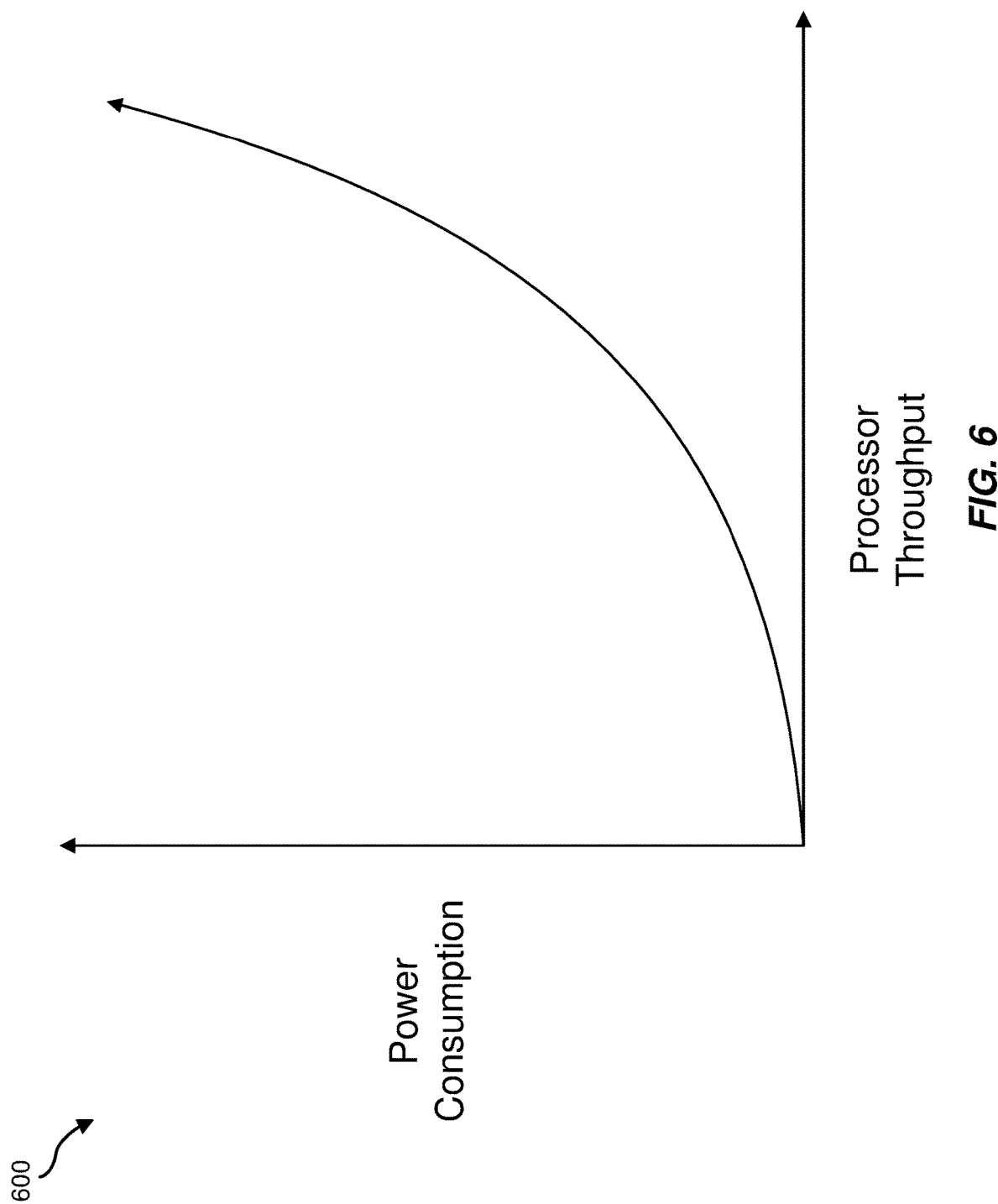
FIG. 6 is a graph diagram illustrating a relationship between clock speed of a physical processor and the power consumption of the physical processor.

As described above, optimization module 110 may configure any suitable aspect or combination of aspects of the executing system such as clock speed, processor voltage, number of processor cores, number of processors, etc. based on any suitable combination of execution metric 204, quality-of-service metric 206, information about the executing system, architectures of physical processor 130, combinations of one or more of the same, and/or any other metric that relates processing throughput of artificial neural network 202 to power consumed by executing artificial neural network 202. FIG. 6 shows an example graph 600 that illustrates a relationship between processor throughput of physical processor 130 and the power consumed by physical processor 130. Power consumption of a physical processor may increase in a nonlinear fashion relative to processor throughput. In the example of FIG. 6, power consumption may increase superlinearly (e.g., quadratically) relative to the processor throughput of physical processor 130. Therefore, optimization module 110 may optimize an executing system by configuring the physical processors of the executing system to execute artificial neural network 202 at a minimum processor throughput that still satisfies quality-of-service metric 206.

Optimization module 110 may receive execution metric 204 and quality-of-service metric in a variety of ways. In embodiments where modules 102 and artificial neural network 202 execute on the same computing device, e.g., computing device 208 in FIG. 2, optimization module 110 may receive execution metric 204 directly from analysis module 106. Similarly, optimization module 110 may receive quality-of-service metric 206 directly from determination module 108.

In some embodiments, one or more of the modules described herein may execute on a backend system while artificial neural network 202 executes on a separate and distinct computing system. For example, and as illustrated in FIG. 3, identification module 104, analysis module 106, determination module 108, and optimization module 110 may execute on computing device 208. Meanwhile, artificial neural network 202 may execute on executing system 308 that is separate and distinct from computing device 208. In these embodiments, the systems and methods described herein may associate ANN metadata 304 with artificial neural network 202, as described in greater detail above. In these embodiments, an instance of optimization module 110 may retrieve execution metric 204 from ANN metadata 304. Optimization module 110 may then configure physical processor 306 of executing system 308 based on execution metric 204 and quality-of-service metric 206. Additionally or alternatively, optimization module 110 may provide execution metric 204 as retrieved from ANN metadata to a management system of executing system 308 that configures the processing throughput of physical processor 306.

In some embodiments, the systems and methods described herein may determine execution metrics for a variety of different system architectures and include all or a portion of these metrics in ANN metadata 304. Instances of optimization module 110 running on executing systems may retrieve an execution metric appropriate to the system architecture of the executing system. For example, and with returning reference to FIG. 3, optimization module 110 executing on executing system 308 may retrieve a version of execution metric 204 from ANN metadata 304 that is appropriate to the architecture of executing system 308.

As described above, some executing systems may have varying QoS needs based on a variety of factors, resulting in changes in quality-of-service metric 206. In these embodiments, optimization module 110 may detect such a change in quality-of-service metric 206. Optimization module 110 may then, in response to detecting the change in quality-of-service metric 206, re-optimize the power consumption of the executing system by reconfiguring, based on execution metric 204 and the updated quality-of-service metric 206, the processing throughput of physical processor 130. By re-optimizing the processing throughput of physical processor in this way, optimization module 110 may ensure that the executing system continues to satisfy quality-of-service metric 206 while also maintaining minimum power consumption while executing artificial neural network 202.

FIG. 7 is an illustration showing how optimization module 110 may vary the clock speed and/or other processing throughput of a physical processor in response to a changing QoS metric. As the QoS metric increases in stringency (e.g., by requiring that the executing system process more image frames per second), optimization module 110 may respond by increasing the processing throughput of the physical processor to ensure that the executing system is able to satisfy the stricter QoS metric. Conversely, optimization module 110 may reduce the clock speed and/or processing throughput of the physical processor in response to a decrease in the QoS metric (e.g., the QoS metric requires fewer frames per second to be processed), thereby reducing the power consumed by the physical processor as it executes artificial neural network 202 while still satisfying the QoS metric.

As described above, the systems and methods described herein may optimize the functioning of physical hardware that executes artificial neural networks. Artificial neural networks may be used in environments with strict QoS requirements. However, other scenarios may allow for a more relaxed QoS. In these scenarios, maximizing processing throughput may not provide any tangible benefit and merely waste power, especially given that processors and other electronic components may become less power efficient as processing throughput is increased. The systems and methods described above may minimize power waste and ensure that applicable QoS standards are met for systems that execute artificial neural networks by leveraging the fact that the execution time of an artificial neural network may be highly predictable. An analysis component may provide an optimization component with information relating to the execution time and/or number of mathematical operations required by the artificial neural network to process an input. The optimization component may then use this execution metric in conjunction with any applicable QoS requirements to determine an optimal configuration for the physical hardware that executes the artificial neural network.

Processors may be more power-efficient when operating at lower frequencies, leading to potential tradeoffs between speed and power efficiency. Some applications may have quality-of-service requirements. To conserve power, systems described herein may set the processor frequency high enough to ensure that a target quality-of-service level is met but no higher. Because the execution time of a neural network may be fully predictable, information about the execution time of a neural network may be used to determine with high precision what processor frequency is needed to meet a quality-of-service standard when executing the neural network. For example, when a neural network is compiled, systems described herein may record attributes of the neural network useful for calculating the number of processor cycles needed to execute the neural network. These systems may bundle this information with the neural network, thereby providing the information to a quality-of-service engine that regulates the execution of the neural network on a processor.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an artificial neural network to be analyzed, generate an execution metric of the artificial neural network based on a static analysis of the artificial neural network, output the execution metric to metadata associated with the artificial neural network, and use the execution metric to optimize the power consumption of at least one physical processor involved in executing the artificial neural network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method comprising:
identifying an artificial neural network that processes each input to the artificial neural network in a fixed number of operations;
performing an analysis on the artificial neural network to determine an execution metric that represents the fixed number of operations performed by the artificial neural network to process each input;

determining a quality-of-service metric for an executing system that executes the artificial neural network; and optimizing power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system.

2. The method of claim 1, wherein configuring the processing throughput of the at least one physical processor comprises configuring a clock speed of the at least one physical processor.

3. The method of claim 1, wherein the quality-of-service metric indicates a desired number of inputs to the artificial neural network to be processed by the executing system within a pre-determined amount of time.

4. The method of claim 1, wherein:
the inputs to the artificial neural network comprise image frames; and
the quality-of-service metric indicates a desired number of image frames per second to be processed by the executing system.

5. The method of claim 1, further comprising:
detecting a change in the quality-of-service metric; and
in response to detecting the change in the quality-of-service metric, re-optimizing the power consumption of the executing system by reconfiguring, based on the execution metric and quality-of-service metric, the processing throughput of the at least one physical processor.

6. The method of claim 1, wherein the analysis comprises a static analysis of the artificial neural network that determines the execution metric without executing the artificial neural network.

7. The method of claim 1, wherein performing the analysis on the artificial neural network occurs in response to identifying the artificial neural network as a processing element that predictably processes each input in a fixed number of operations.

8. The method of claim 1, wherein performing the analysis comprises performing the analysis when the artificial neural network is compiled.

9. The method of claim 1, wherein performing the analysis comprises:
identifying a number of artificial neurons included in the artificial neural network and a number of neural network layers included in the artificial neural network; and
calculating the fixed number of operations based on at least the number of artificial neurons and the number of neural network layers included in the artificial neural network.

10. The method of claim 1, wherein performing the analysis comprises calculating the fixed number of operations based on an architecture of the executing system.

11. The method of claim 1, wherein:
performing the analysis on the artificial neural network comprises including the execution metric in metadata that is associated with the artificial neural network; and
configuring the processing throughput of the at least one physical processor comprises:
retrieving the execution metric from the metadata that is associated with the artificial neural network; and
providing the execution metric to a management system that configures the processing throughput of the at least one physical processor.

12. The method of claim 1, wherein configuring the processing throughput of the at least one physical processor comprises configuring the at least one physical processor to execute the artificial neural network on a number of processor cores of the at least one physical processor that enables the executing system to satisfy the quality-of-service metric while limiting the power consumption of the executing system.

13. The method of claim 1, wherein the artificial neural network comprises a software-implemented artificial neural network.

14. The method of claim 1, wherein the artificial neural network comprises a hardware-implemented artificial neural network.

15. A system comprising:
an identification module, stored in a memory of the system, that identifies an artificial neural network that processes each input to the artificial neural network in a fixed number of operations;
an analysis module, stored in the memory, that performs an analysis on the artificial neural network to determine an execution metric that represents the fixed number of operations performed by the artificial neural network to process each input;
a determination module, stored in the memory, that determines a quality-of-service metric for an executing system that executes the artificial neural network;
an optimization module, stored in the memory, that optimizes power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system; and
at least one executing physical processor configured to execute the identification module, the analysis module, the determination module, and the optimization module.

16. The system of claim 15, wherein the optimization module configures the processing throughput of the at least one physical processor by configuring a clock speed of the at least one physical processor.

17. The system of claim 15, wherein the quality-of-service metric indicates a desired number of inputs to the artificial neural network to be processed by the executing system within a pre-determined amount of time.

18. The system of claim 15, wherein:
the inputs to the artificial neural network comprise image frames; and
the quality-of-service metric indicates a desired number of image frames per second to be processed by the executing system.

19. The system of claim 16, wherein:
the determination module detects a change in the quality-of-service metric; and
in response to the determination module detecting the change in the quality-of-service metric, the optimization module re-optimizes the power consumption of the executing system by reconfiguring, based on the execution metric and the quality-of-service metric, the processing throughput of the at least one physical processor.

20. A non-transitory computer-readable medium comprising one or more computer-readable instructions that, when executed by at least one processor of a computing device, cause the computing device to:
- identify an artificial neural network that processes each input to the artificial neural network in a fixed number of operations;
- perform an analysis on the artificial neural network to determine an execution metric that represents the fixed number of operations performed by the artificial neural network to process each input;
- determine a quality-of-service metric for an executing system that executes the artificial neural network; and
- optimize power consumption of the executing system by configuring, based on the execution metric and the quality-of-service metric, a processing throughput of at least one physical processor of the executing system, thereby causing the executing system to execute the artificial neural network at a rate that satisfies the quality-of-service metric while limiting the power consumption of the executing system.

* * * * *